United States Patent
De Rosny et al.

(10) Patent No.: US 11,843,444 B2
(45) Date of Patent: Dec. 12, 2023

(54) AMBIENT BACKSCATTERING COMMUNICATION SYSTEM, ASSOCIATED APPARATUS AND METHOD

(71) Applicants: Centre national de la recherche scientifique, Paris (FR); ECOLE SUPERIEURE DE PHYSIQUE ET DE CHIMIE INDUSTRIELLES DE LA VILLE DE PARIS, Paris (FR); ORANGE SA, Paris (FR)

(72) Inventors: Julien De Rosny, Nogent sur Marne (FR); Dinh-Thuy Phan-Huy, Chatillon (FR); Nissem Selmene, Chatillon (FR)

(73) Assignees: CENTRE NATIONAL DE LA RECHERCHE SCIENTIFIQUE, Paris (FR); ECOLE SUPERIEURE DE PHYSIQUE ET DE CHIMIE INDUSTRIELLES DE LA VILLE DE PARIS, Paris (FR)

( * ) Notice: Subject to any disclaimer, the term of this patent is extended or adjusted under 35 U.S.C. 154(b) by 264 days.

(21) Appl. No.: 17/414,385

(22) PCT Filed: Dec. 17, 2019

(86) PCT No.: PCT/EP2019/085773
§ 371 (c)(1),
(2) Date: Jun. 16, 2021

(87) PCT Pub. No.: WO2020/127363
PCT Pub. Date: Jun. 25, 2020

(65) Prior Publication Data
US 2022/0052752 A1 Feb. 17, 2022

(30) Foreign Application Priority Data
Dec. 18, 2018 (FR) ...................... 1873139

(51) Int. Cl.
*H04B 7/10* (2017.01)
*H04B 1/10* (2006.01)
*H04W 24/02* (2009.01)

(52) U.S. Cl.
CPC ............. *H04B 7/10* (2013.01); *H04B 1/1081* (2013.01); *H04W 24/02* (2013.01)

(58) Field of Classification Search
CPC ...... H04B 5/0062; H04B 5/0068; H04B 7/14; H04B 7/145; H04B 7/15571
See application file for complete search history.

(56) References Cited

U.S. PATENT DOCUMENTS

2015/0108210 A1 4/2015 Zhou
2020/0313939 A1* 10/2020 Lopez ................ H04L 27/2626

OTHER PUBLICATIONS

Van Huynh Nguyen et al., "Ambient Backscatter Communications: A Contemporary Survey", IEEE Communications Surveys & Tutorials, vol. 20, No. 4, Nov. 19, 2018, pp. 2889-2922.

* cited by examiner

*Primary Examiner* — Kevin Kim
(74) *Attorney, Agent, or Firm* — WC&F IP

(57) ABSTRACT

The present invention relates to an ambient backscattering communication system (14), the communication system (14) comprising:
an ambient backscattering transmitter (16) suitable for generating an ambient backscattering signal according to a first polarization from an ambient signal incident on the transmitter (16),
an ambient backscattering receiver (18) suitable for detecting the ambient backscattering signal transmitted by the ambient backscattering transmitter according to a second polarization, and
a reduction device (22) for reducing the interference between the ambient backscattering signal and an (Continued)

ambient signal incident on the receiver, the reduction device (22) controlling the first polarization and the second polarization and wherein at least one of said first and second polarizations is adjustable.

9 Claims, 2 Drawing Sheets

AMBIENT BACKSCATTERING COMMUNICATION SYSTEM, ASSOCIATED APPARATUS AND METHOD

The present invention relates to an ambient backscattering communication system. The invention also relates to an apparatus comprising the above system. The invention also relates to a method of optimizing ambient backscattering communication in the communication system, as well as an associated computer program product and readable information medium.

The ambient backscattering technique is a communication technique that allows a transmitter to send a message to a receiver without emitting any additional radio waves to the waves already present.

An example of such a technique is described in particular in US 2015/0108210 A and an article by Van Huynh et al. entitled "Ambient Backscatter Communications: A Contemporary Survey" taken from IEEE COMMUNICATIONS SURVEYS & TUTORIALS, Volume 20, Issue 4 dated Nov. 19, 2018.

The transmitter modifies ambient radio waves emitted from ambient sources, and the receiver detects these modifications. The detection by the receiver of the signal from the transmitter is disturbed by the presence of interference between the transmitter signal and the signal coming directly from the source. Therefore, it is desirable to improve the quality of reception of the signal coming from the transmitter.

For this, the use of a signal processing module at the receiver, to eliminate the disturbing interference between the two signals, is known. For example, such a processing module estimates the contribution to the propagation channel between the source and the receiver due to the direct path alone, for example by looking for a maximum correlation between a received reference signal and a reference signal transmitted by the source. The processing module then applies a channel equalization based on the direct path channel only to a received data signal. By means of modulation-demodulation, the most important part of the interference can then be removed from the final signal.

However, such a processing module involves an additional resource that performs complex operations, resulting in increased power consumption.

Therefore, there is a need for an ambient backscattering communication system that has good reception quality with lower power consumption.

To this end, the description describes an ambient backscattering communication system, the communication system comprising an ambient backscattering transmitter suitable for generating an ambient backscattering signal according to a first polarization from an ambient signal incident on the transmitter, an ambient backscattering receiver suitable for detecting the ambient backscattering signal transmitted by the ambient backscattering transmitter according to a second polarization, and a reduction device for reducing the interference between the ambient backscattering signal and an ambient signal incident on the receiver, the reduction device controlling the first polarization and the second polarization, at least one of said first and second polarizations being adjustable.

According to particular embodiments, the system has one or more of the following features, taken alone or in any technically possible combination:

the first polarization and the second polarization have a first angle between them, the reduction device controlling the first angle so that the value of a communication system performance criterion is optimized, the criterion being selected from the group consisting of error rate, throughput, transmission time, signal-to-noise ratio and interference, and quality of service.

the reduction device comprises a first member for controlling the first polarization and a second member for controlling the second polarization.

the transmitter is made of a material that can be reconfigured by polarization, the first control device being a material that can be reconfigured by polarization.

the system also comprises a source capable of generating an ambient signal according to a third polarization, the reduction device also controlling the third polarization the third polarization and the second polarization have a second angle between them, the reduction device controlling the second angle so that the value of a communication system performance criterion is optimized, the criterion being selected from the group consisting of error rate, throughput, transmission time, signal-to-noise ratio and interference, and quality of service.

The present description also provides an apparatus comprising a system as previously described.

The present description also describes a method for optimizing ambient backscattering communication in an ambient backscattering communication system comprising an ambient backscattering transmitter suitable for generating an ambient backscattering signal according to a first polarization from an ambient signal incident on the transmitter, an ambient backscattering receiver suitable for detecting, according to a second polarization, the ambient backscattering signal transmitted by the ambient backscattering transmitter, and a reduction device for reducing the interference between the ambient backscattering signal and an ambient signal incident on the receiver, the reduction device controlling the first polarization and the second polarization, at least one of said first and second polarizations being adjustable, the method comprising at least one step of varying the first polarization and the second polarization so that the value of a communication system performance criterion is optimized, the criterion being selected from the group consisting of error rate, throughput, transmission time, signal-to-noise ratio and interference, and quality of service.

The present description also provides a computer program product comprising a readable information medium on which a computer program is stored, comprising program instructions, the computer program being loadable onto a data processing unit and adapted implement at least one step of the method as previously described when the computer program is implemented on the data processing unit.

The present description also provides a readable information medium on which a computer program product as previously described is stored.

Features and advantages of the invention will become apparent from the following description, given only as a non-limiting example, and made with reference to the attached drawings, in which.

Figure 1:
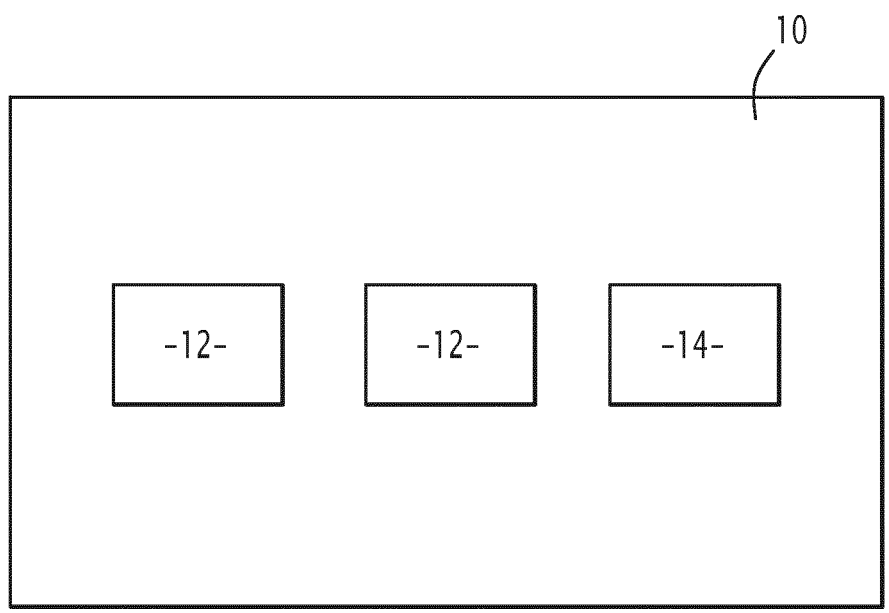
FIG. 1 is a schematic representation of an example of an apparatus.

An apparatus 10 is shown in FIG. 1.

According to the example shown, the apparatus 10 is a connected object.

A connected object is an object that is electronic and shares data with another object via a wireless network.

The apparatus 10 comprises a plurality of elements 12 including an ambient backscattering communication system 14.

An ambient backscattering communication system 14 is a system adapted to implement an ambient backscattering technique, that is, to establish communication between two elements without emitting any additional radio waves than the waves already present.

Figure 2:
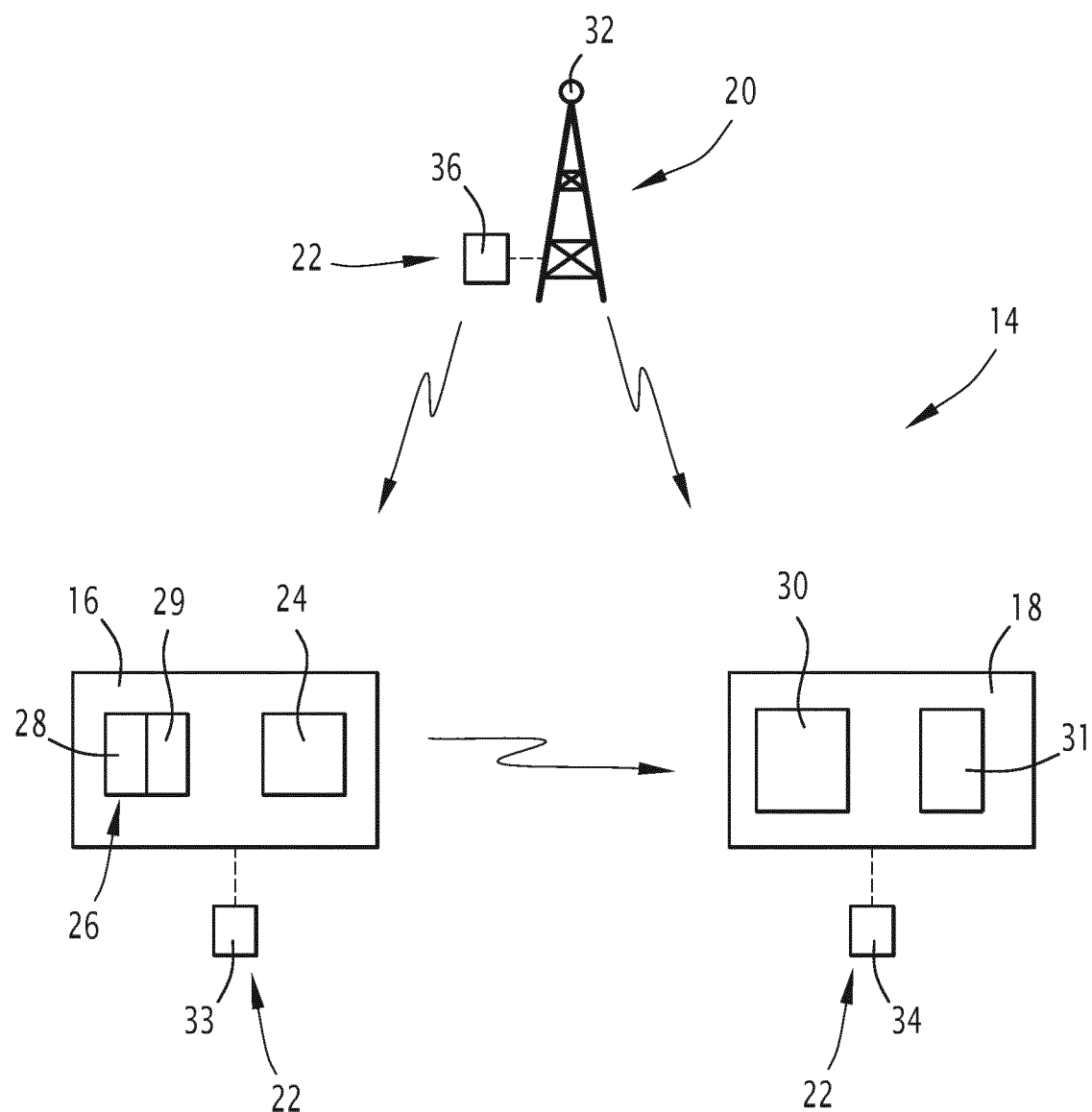
FIG. 2 is a schematic view of a communication system forming part of the apparatus.

An example of a communication system 14 is illustrated in more detail in FIG. 2.

The communication system 14 comprises an ambient backscattering transmitter 16, an ambient backscattering receiver 18, a source 20 and an interference reduction device 22.

The transmitter 16 is suitable for generating an ambient backscattering signal from an ambient signal according to a first adjustable polarization, referred to as transmitter polarization $P_E$.

The transmitter 16 is reconfigurable into a first plurality of states.

The first plurality of states, denoted E, groups the plurality of states of the transmitter 16 with at least two different polarization states. E, by definition, is the cardinal of $\varepsilon$, which is written E=card($\varepsilon$).

For example, E=2 can be made with two orthogonal dipoles. Indeed, a first state can be obtained by putting the two wires of the first dipole in short circuit and the two wires of the second dipole in open circuit, and the second state can be obtained by putting the two wires of the first dipole in open circuit, the two wires of the second dipole in closed circuit. The polarization orientation of the that is best backscattered in the first state (that of the short-circuited dipole) is orthogonal to the orientation that is best backscattered in the second state (that of the short-circuited dipole).

According to another example, it has already been shown that achievements at E=100 are possible, notably in a paper by M. Dupré et al. entitled "*Wave-Field Shaping in Cavities: Waves Trapped in a Box with Controllable Boundaries*" (Physical Review Letters 115 (2015): 017701).

A subset of $\varepsilon$ called modulation $\mathcal{M}$ is defined, comprising at least two different polarization states.

Or M=card($\mathcal{M}$).

The transmitter is thus suitable for emitting a message composed of symbols by switching between the M states of a modulation $\mathcal{M}$, and applying the correspondence between symbols and states.

In the proposed example, the transmitter 16 comprises a resonator 24, called a backscattering resonator 24, and a switching circuit 26.

The backscattering resonator 24 is reconfigurable.

The backscattering resonator 24 is made of a material that can be reconfigured by polarization polarization, for example.

The material that can be reconfigured by polarization is preferably selected to be capable of interacting with waves emitted from the source 20.

Several examples of reconfigurable backscattering resonators 24 are conceivable.

For example, the backscattering resonator 24 comprises at least two crossed dipoles, each of which can be independently switched to an open or closed circuit.

In a variant, the backscattering resonator 24 is an elementary antenna of a dual or multiple polarization antenna array.

According to another example, the backscattering resonator 24 is implemented as a multi-port antenna generating at least two different polarizations. The ports are connected to a switch capable of changing the load impedance of the ports.

The receiver 18 is able to detect the ambient backscattering signal transmitted by the transmitter 16 according to a second adjustable polarization, called receiver polarization $P_R$.

The receiver 18 is reconfigurable according to a second plurality of states.

The second plurality of states noted $\mathcal{R}$ consists of R states (R=card($\mathcal{R}$)).

The same values as for the integer E are also possible for the integer R.

In the proposed example, the receiver 18 comprises an antenna 30, called the receiving antenna 30, and a switching circuit 31.

The receiving antenna 30 is reconfigurable.

According to a particular example, the receiving antenna 30 is a cavity-backed slot antenna.

In such an example, the receiving antenna 30 may have four distinct polarizations, namely two circular and two parallel.

In a variant, the receiving antenna 30 may have two dipole sub-antennas with orthogonal linear polarization.

According to yet another example, the receiving antenna 30 comprises two dual polarization sub-antennas, each having two ports connected to a respective radio frequency switch.

The receiving antenna 30 has optimized properties for detecting waves at selected frequencies, in particular the wave frequencies emitted by the source 20.

The above remarks on the switching circuit 26 of the transmitter 16 also apply to the switching circuit 31 of the receiver 18 and are not repeated here.

The source 20 is a source that generates an ambient signal according to a third polarization, the so-called $P_S$ source polarization.

In this case, this means that the source 20 is suitable for emitting waves.

In particular, the source 20 is suitable for emitting radio frequency waves.

As an illustration, the source 20 is an access point of a wireless network, in particular a WIFI network or an FM radio transmitter.

In the example described, the source 20 is included in the apparatus 10, and the third polarization is adjustable.

However, in many cases, the third polarization is fixed, particularly when the source 20 is not part of the apparatus 10. As a particular example of such a case, the source 20 is a television transmitter, particularly a digital terrestrial television tower.

The source 20 is reconfigurable into a third plurality of states.

The third plurality of states noted $\mathcal{S}$ consists of S states (S=card($\mathcal{S}$)).

The same values as for the integer E are also possible for the integer S.

The source 20 includes an antenna 32, called source antenna 32.

The same remarks as for the receiving antenna 30 apply for the source antenna 32 and are not repeated here.

In particular, in the proposed example, the source antenna 30 is reconfigurable.

The reduction device 22 is a device reducing the interference between the ambient backscattering signal and an ambient signal incident on the receiver 18.

In the proposed example, the reduction device 22 controls the transmitter polarization $P_E$, the receiver polarization $P_R$ and the source polarization $P_S$.

The reduction device 22 comprises three polarization control devices 33, 34 and 36.

Each control device 33, 34 and 36 is able to vary the polarization of the element in question according to several values, continuous or not.

More specifically, the reduction device 22 comprises a first control device 33 for the transmitter polarization $P_E$, a second control device 34 for the receiver polarization $P_R$ and a third control device 36 for the source polarization $P_S$.

According to the example described, the first control device 33 is a material reconfiguration device.

For example, the first control device 33 is suitable for providing energy to reconfigure the material in which the backscattering resonator 24 is formed.

In the case of FIG. 2, the control devices 33, 34, and 36 are shown as separate, but some or all may be combined.

In operation, the reduction device 22 controls the polarization of the transmitter 16, the polarization of the receiver 18 and the polarization of the source 20 to achieve a favorable configuration. Favorable configuration means a configuration that improves at least one criterion compared to a configuration where the polarizations are not controlled.

In other words, the reduction device 22 takes advantage of the polarization effect to attenuate the contribution of the ambient signal to favor the detection of the ambient backscattering signal.

One way to quantify this effect is to calculate the contrast induced by the transmitter 16. This contrast can be defined as the intensity variation recorded by the receiver 18 and induced by the transmitter 16 on the average intensity received by the receiver 18. Thus, the contrast is written:

$$\eta = 2 \frac{|I_1 - I_0|}{I_1 + I_0}$$

where:
  $\eta$ is the contrast,
  $I_0$ is the intensity when the transmitter 16 has uncontrolled polarization (state 0), and
  $I_1$ is the intensity when the emitter 16 has a polarization controlled by the reduction device 22 (state 1).

The contrast depends on the three polarizations, as will be shown in the following, using the Jones vector formalism.

The transmit polarization $P_E$ is thus represented by a transmit polarization vector $V_E$, the receive polarization $P_R$ by a receive polarization vector $V_R$ and the source polarization $P_S$ by a source polarization vector $V_S$.

Further, in the following the notation (A,B) represents the complex $A_1 B_1 + A_2 B_2$.

When the transmitter 16 is in state 1, the signal received SR by the receiver 18 is expressed as:

$$SR = \beta(V_S, V_R)$$

where $\beta$ is a complex proportionality factor that takes into account the effects of propagation (phase, attenuation, etc.).

When the transmitter 16 is in state 0, the signal received SR by the receiver 18 is expressed as:

$$SR = \beta(V_S, V_R) + \beta\alpha(V_S, V_E)(V_E, V_R)$$

where $\alpha$ is a complex factor that describes the effect of scattering and propagation.

Using the previous two expressions, the following formula is derived, for contrast:

$$\eta = \frac{2|\alpha|^2|(V_S, V_E)|^2|(V_S, V_R)|^2 + 2\Re[\alpha(V_S, V_E)^*(V_S, V_E)(V_E, V_R)]}{2|(V_S, V_R)|^2 + |\alpha|^2|(V_S, V_E)|^2|(V_S, V_R)|^2 + 2\Re[\alpha(V_S, V_E)^*(V_S, V_E)(V_E, V_R)]}$$

Maximizing the following expression for the case of three linear polarizations, it occurs that the optimal angle for the receiver polarization $P_R$ is 90° with respect to the source polarization $P_S$ and the optimal angle for the transmitter polarization $P_E$ is the arithmetic average of the receiver polarization $P_R$ and the source polarization $P_S$.

The reduction device 22 thus controls the three polarizations $P_R$, $P_S$ and $P_E$ to meet the above criteria so that the previously defined contrast is optimized.

It should be noted that the previous reasoning remains valid for more complex polarizations, especially elliptical ones.

Moreover, the same reasoning is also transposable for other criteria for improving the communication of the backscattering signal.

The goal is therefore to optimize the value of the performance criterion, which can be maximized or minimized depending on the case.

Among these performance criteria, we can mention the level of the backscattering signal detected by the receiver 18, the error rate, the transmission time, the signal-to-noise ratio and interference, and the quality of service.

As a particular example, it could be envisaged using the sum of $I_0$ and $I_1$ as a criterion to maximize or to ensure that the difference between $I_1$ and $I_0$ is greater than the noise.

The reduction device 22 provides an ambient backscattering communication system 14 that has good reception quality with lower power consumption.

Further, the tuning of the communication system 14 is particularly easy, as will be explained with reference to the implementation of a method for optimizing the ambient backscattering communication in the communication system 14 so that the performance criterion is less than or equal to a threshold value.

According to a first example referred to as example A, the method is implemented manually.

For example, in the case of linear polarizations, the polarizations of the source $P_S$, the receiver $P_R$, and the transmitter $P_E$ are varied so that the receiver $P_R$ polarization and the source $P_S$ polarization are orthogonal and the receiver $P_R$ polarization and the transmitter $P_E$ polarization are not parallel.

Example A is particularly suitable for obstacle-free environments.

According to a second example, called example B, the method is implemented automatically assuming that only the transmitter 16 and the receiver 18 have to be adjusted.

The method is thus implemented at least in part in a computerized manner.

The method may thus comprise the use of a computer program product comprising a readable information medium on which a computer program is stored, comprising program instructions, the computer program being loadable onto a data processing unit and adapted to implement at least one step of the method when the computer program is implemented on the data processing unit.

This implies that the method according to example B is intended to determine the optimal value of a doublet (m,r), to maximize one of the aforementioned improvement criteria. By definition, m is an element of $\mathcal{M}$ and r is an element of $\mathcal{R}$.

The method according to example B includes a test step for each possible doublet (m, r).

In such a test step for a doublet, the transmitter 16 is configured to use m and the receiver 18 is configured in state r.

The transmitter 16 and receiver 18 are kept in such a configuration for a time interval greater than or equal to the minimum time interval during which the transmitter transmits the entirety of at least one test message.

An example of a test message is a set of messages known to the receiver, each comprising a cyclic redundancy check field (also referred to as CRC) transmitted at known times preceded by a timing sequence known to the receiver 18.

The receiver 18 receives the test message and, using the timing sequence, the receiver 18 demodulates the test message. The receiver 18 performs a verification of the cyclic redundancy check field and deduces whether the message received is correctly decoded or is erroneous. When the message is correct, the communication indicator is equal to 1, but, conversely, with an invalid message, the communication indicator is equal to 0. In the presence of several cyclic redundancy control fields, for example, the indicator is an arithmetic average of all the communication indicators determined after verification of each cyclic redundancy control field.

According to another example, the test message is a set of messages known to the receiver and preceded by a synchronization sequence known to the receiver.

This other example is similar to the previous case, the determination of the communication indicator being obtained by comparing the demodulated message with the known message and evaluating the symbol error rate (indicator between 0 and 1).

The succession of the different values of m and r in order to carry out each test step is done, for example, according to a predefined order and rhythm known to both the receiver and the transmitter.

Finally, the method according to example B comprises a step of comparing the indicators of each doublet (m, r) to obtain the doublet with the best indicator.

The communication system 14 is thus adjusted.

The extension to the case of a reconfigurable source corresponds to the case of example B in which all triplets (m, r, s) are tested with s an element of $\mathcal{S}$, instead of testing all possible doublets (m,r).

For example, it is possible to set the value of s, then implement the method of example B, then change the value of s and implement the method of example B, and so on.

For each new value of s, an optimal doublet (m, r) is thus obtained as a communication indicator. It then becomes possible to select the optimal value of s by comparing the communication indicators. The whole triplet corresponds to the selected value of s and to the optimal doublet (m, r) associated to this value of s.

The process just described also shows that the reduction device 22 can also be used when the source 20 is not polarization adjustable.

In any case, the reduction device 22 increases the performance of the communication system 14 with low power consumption involved.

The invention claimed is:

1. An ambient backscattering communication system, the communication system comprising:
   an ambient backscattering transmitter suitable for generating an ambient backscattering signal according to a first polarization from an ambient signal incident on the transmitter,
   an ambient backscattering receiver suitable for detecting the ambient backscattering signal transmitted by the ambient backscattering transmitter according to a second polarization, and
   a reduction device for reducing the interference between the ambient backscattering signal and an ambient signal incident on the receiver, the reduction device controlling the first polarization and the second polarization,
   and wherein at least one of said first and second polarizations is adjustable.

2. The communication system according to claim 1, wherein the first polarization and the second polarization have a first angle between them, the reduction device controlling the first angle so that the value of a performance criterion of the communication system is optimized, the criterion being selected from the group consisting of error rate, throughput, transmission time, signal-to-noise and interference ratio, and quality of service.

3. The communication system according to claim 1, wherein the reduction device comprises a first control device for the first polarization and a second control device for the second polarization.

4. The communication system according to claim 3, wherein the transmitter is made of a material that can be reconfigured by polarization, the first control device being a material reconfiguration member.

5. The communication system according to claim 1, wherein the system further comprises a source capable of generating an ambient signal according to a third polarization, the reduction device also controlling the third polarization.

6. The communication system according to claim 5, wherein the third polarization and the second polarization have a second angle between them, the reduction device controlling the second angle so that the value of a performance criterion of the communication system is optimized, the criterion being selected from the group consisting of error rate, throughput, transmission time, signal-to-noise and interference ratio, and quality of service.

7. An apparatus comprising a system according to claim 1.

8. A method for optimizing ambient backscattering communication in an ambient backscattering communication system comprising:
   an ambient backscattering transmitter suitable for generating an ambient backscattering signal according to a first polarization from an ambient signal incident on the transmitter,
   an ambient backscattering receiver suitable for detecting the ambient backscattering signal transmitted by the ambient backscattering transmitter according to a second polarization, and
   a reduction device for reducing the interference between the ambient backscattering signal and an ambient signal incident on the receiver, the reduction device controlling the first polarization and the second polarization
   at least one of said first and second polarizations being adjustable,
   the method comprising at least one step of:
   varying the first polarization and the second polarization so that the value of a performance criterion of the communication system is optimized, the criterion being selected from the group consisting of error rate, throughput, transmission time, signal-to-noise ratio and interference, and quality of service.

9. A computer program product comprising a non-transitory readable information medium on which a computer program is stored, comprising program instructions, the computer program being loadable onto a data processing unit and suitable for implementing each of the steps of the method according to claim 8 to be implemented when the computer program is implemented on the data processing unit.

\* \* \* \* \*

UNITED STATES PATENT AND TRADEMARK OFFICE
CERTIFICATE OF CORRECTION

| | |
|---|---|
| PATENT NO. | : 11,843,444 B2 |
| APPLICATION NO. | : 17/414385 |
| DATED | : December 12, 2023 |
| INVENTOR(S) | : Julien De Rosny, Dinh-Thuy Phan-Huy and Nissem Selmene |

It is certified that error appears in the above-identified patent and that said Letters Patent is hereby corrected as shown below:

On the Title Page

Item (73) is corrected as follows:
Assignees: Centre National De La Recherche Scientifique, Paris (FR);
Ecole Superieure De Physique Et De Chimie Industrielles De La Ville De Paris, Paris (FR);
Orange SA, Paris (FR)

Signed and Sealed this
Thirtieth Day of July, 2024

Katherine Kelly Vidal
*Director of the United States Patent and Trademark Office*